March 16, 1937.     A. SHAPIRO     2,074,278
ICE CREAM CONE
Filed June 28, 1935
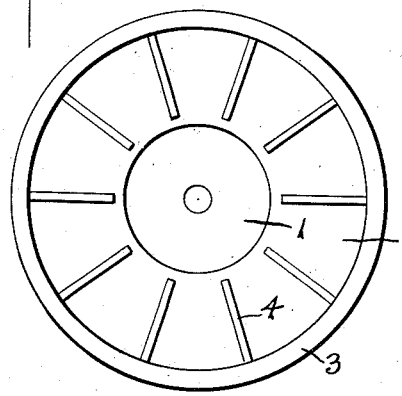
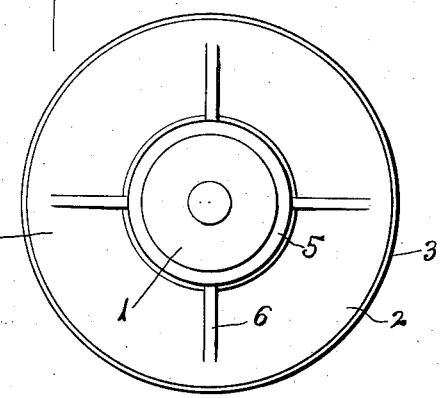
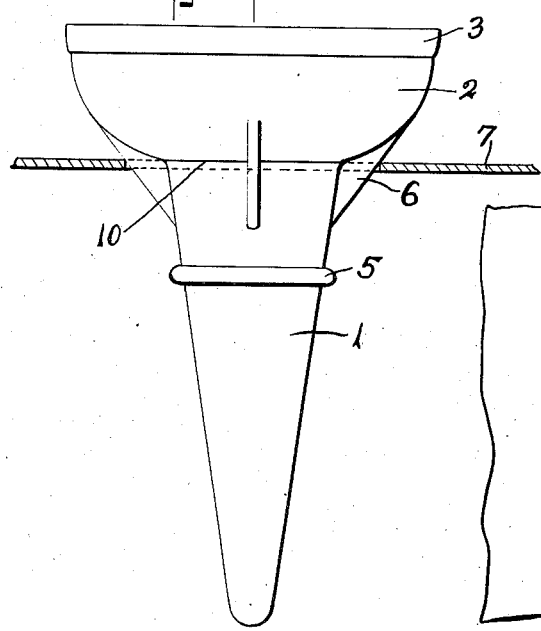
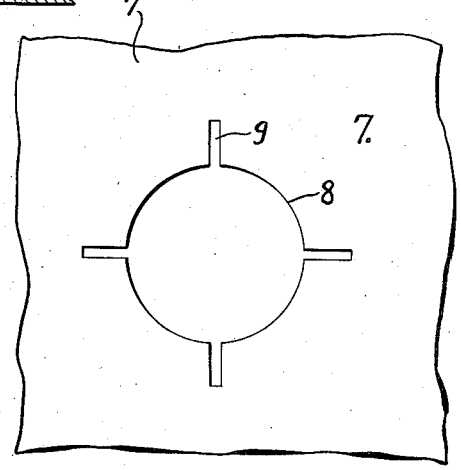
Inventor
Arthur Shapiro
By Albert E. Dieterich
Attorney

UNITED STATES PATENT OFFICE 2,074,278

ICE CREAM CONE

Arthur Shapiro, Chelsea, Mass., assignor of one-fourth to Joseph Shapiro, Baltimore, Md., one-fourth to Isaac Shapiro, Chicago, Ill., one-fourth to Nathan Shapiro, and one-fourth to Samuel Shapiro, both of Chelsea, Mass.

Application June 28, 1935, Serial No. 28,964

1 Claim. (Cl. 99—89)

Heretofore an ice cream cone has been manufactured having a relatively large bowl on a relatively thin stem, the bowl being about twice the diameter of that of the ordinary cone, while the stem is of approximately the diameter of the ordinary cone. Experience has shown that with cones having a relatively large bowl on a relatively thin stem considerable breakage occurs in shipment, as well as breakage in filling of the cone. The breakage is due in large measure to the weakness of the wall where the bowl joins the stem, and is caused partly by the cones swiveling around in their containers during transit.

It is therefore an object of my invention to improve such cones by the addition thereto of a plurality of radially disposed ribs on the outside of the cone, joining the bowl with the stem and extending across the weak area where the bowl joins the stem, these ribs serving not only to strengthen the cone and brace the bowl, but also, through the cooperation of slits in the cardboard separators used in shipping to prevent swiveling of the cones in the box in which they are packed; and thus breakage is reduced to a minimum.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claim, reference being had to the accompanying drawing, in which:—

Figure 1 is a side elevation of an ice cream cone embodying my invention.

Figure 2 is a top plan view thereof.

Figure 3 is a bottom plan view thereof.

Figure 4 is a detail plan view of a portion of one of the cardboard separators, showing the slits in which the reinforcing ribs rest to prevent swiveling of the cones.

In the drawing, in which like numerals of reference indicate like parts in all the figures, 1 represents the usual conical stem of an ice cream cone, and 2 indicates the enlarged bowl which in the present cone is about twice the diameter of the top of the stem 1. It has been found that where the bowl and stem join, the weakest place in the cone structure is located. When the cone is being supplied with ice cream the downward pressure on the bowl frequently causes breakage to occur at the place 10 where the stem joins the bowl, the stem, in some instances, cutting upwardly through the bowl.

In my present invention I have reduced this breakage substantially to zero by applying radially disposed diagonal ribs 6 bridging the weak area 10 and uniting the body of the bowl 2 with that of the stem 1. These ribs 6 when the cones are nested for shipment enter slips 9 provided therefor in the separators 7 and thus hold the cones from swiveling.

The cone is provided with the usual reinforcing bead 3 at the mouth and is preferably provided with internal ribs 4 radially disposed for the purpose not only of strengthening the cone, but of holding the ice cream in place in the bowl. These ribs are preferably separated at the center a distance sufficient to enable the nesting ring 5 of an inserted cone to pass and rest on the bottom of the bowl 2 where the stem and the bowl join.

When the bowl is provided with ribs 4 the ribs 6 of one cone cooperate with the ribs 4 of the nested cone to prevent material swiveling of the cones on their axes, even though separators 7 be not used, since the degree of swiveling of one cone within another is limited by contact of ribs 6 with adjacent pairs of ribs 4.

The cone embodying my improvements has been especially designed for receiving ice cream that has been preferably moulded into a conical form, the base of the cone of ice cream being received by the ribs 4.

From the foregoing description, taken in connection with the accompanying drawing, it is thought that the construction and advantages of the invention will be clear.

What I claim is:

An ice cream cone comprising a stem whose upper end is of greater diameter than its lower end, a bowl on the upper end of said stem of about twice the diameter of that of the said upper end, said bowl having a plurality of longitudinal radially disposed thin flat ribs on its inside for strengthening the wall of the bowl and aiding in anchoring ice cream in the bowl, said stem having a nesting ring below the bowl, the adjacent vertical edges of the ribs at the center being spaced apart sufficiently to allow the nesting ring of a nested cone to pass between the same, and a set of bracing ribs extending from the stem above the nesting ring diagonally to the periphery of the bowl, and adapted to lie between pairs of inside ribs when cones are nested.

ARTHUR SHAPIRO.